Nov. 16, 1965 L. SILVERMAN 3,217,471
DIFFUSION BOARD FOR FILTERING HIGH PRESSURE GASES
Filed Sept. 14, 1962
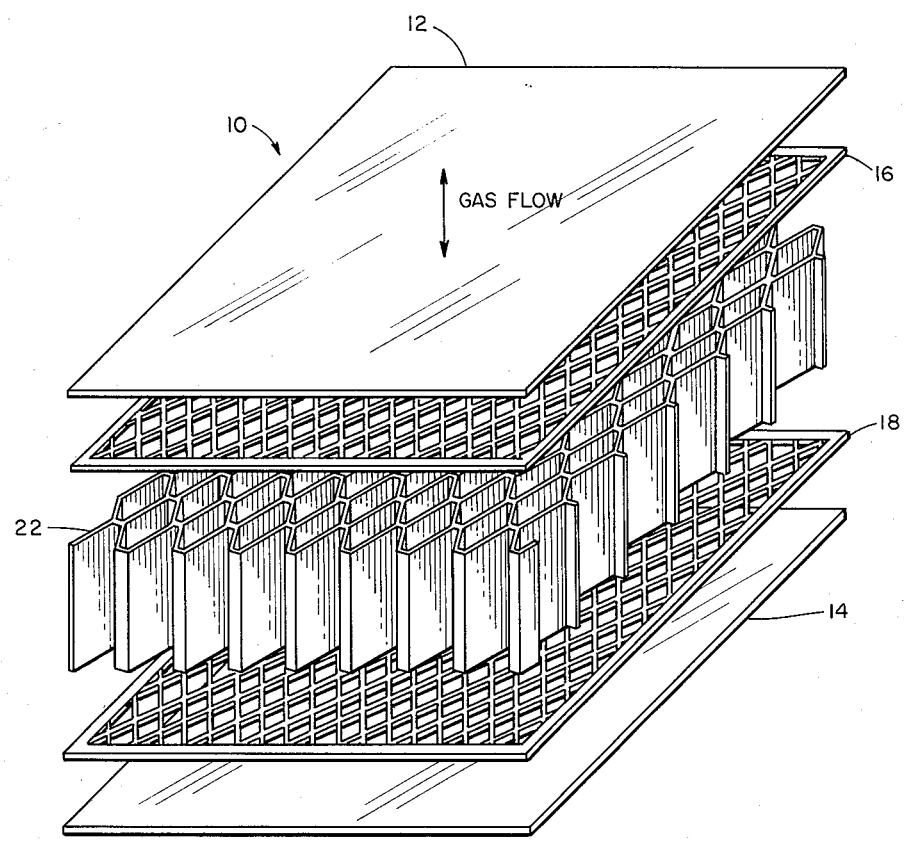
INVENTOR.
LESLIE SILVERMAN
BY

United States Patent Office

3,217,471
Patented Nov. 16, 1965

3,217,471
DIFFUSION BOARD FOR FILTERING HIGH PRESSURE GASES
Leslie Silverman, Dover, Mass., assignor to the United States of America as represented by the United States Atomic Energy Commission
Filed Sept. 14, 1962, Ser. No. 223,855
3 Claims. (Cl. 55—316)

The present invention relates to a diffusion board for filtering high pressure gases and more particularly to a filtering material capable of withstanding shock waves and high temperature.

In a modern nuclear reactor power plant the cost of the reactor containment and off-gas cleaning is quite high when compared to other types of power generation and chemical processing plants. A typical cost figure for the containment and off-gas treatment equipment may range from 5 to 15% of the total nuclear plant cost, and in a few instances the cost is even higher. Hence, in the drive for reducing the cost of nuclear power to more competitive levels it is quite obvious that in the area of containment and off-gas treatment certain cost reductions can be made.

While it is thus highly desirable to find less costly approaches to the nuclear containment and off-gas treatment it is at the same time necessary to maintain the present level of safety and performance and even to increase the degree of safety built into the power plant to permit the latter's use in more densely populated areas. The first concern in this connection in the construction of a nuclear power plant is the elimination of any potential hazard to the public from nuclear excursions or accidents involving subsequent release of fission products. It is well known that the release of large amounts of radioiodine and other radioactive gases to the atmosphere in populated areas could give rise to severe public health and safety problems. The Windscale accident in England several years ago involving a release of an estimated 20,000 curie radioiodine emphasizes this point.

The present invention provides for a way of containing a nuclear power plant at a substantial decrease in cost over present day containment arrangements and at the same time provide an enhanced ability to prevent the release of radioactive particulates and certain dangerous radioactive gases should a nuclear explosion or accident occur involving rupture or release of the contents of a nuclear vessel. In this invention there is provided a construction referred to as a diffusion board which serves as a porous filtration and adsorption membrane for released particulates and radioactive gases and which at the same time is capable of resisting the attendant steam and pressure shock waves. The board is of such construction that it can be used as a building material which, should the nuclear accident occur, has the capability to permit the non-harmful products to diffuse through and trap the dangerous particulates and gases. This construction eliminates the need for expensive standby equipment and apparatus designed to prevent the release of such materials to the surrounding area.

In a preferred form of this invention the diffusion board consists of a combination or laminated structure involving the use of a porous medium and honeycomb structure. The porous medium is a high efficiency filter paper to trap particulate. The honeycomb is made from a honeycomb material such as aluminum, stainless steel or reinforced fiber glass. The cells of the honeycomb contain proper filtering materials as described below to permit all the gas released from a nuclear accident to be decontaminated by efficient removal of radioactive particulate and halogen gases such as bromine and iodine. One or more layers of a rigid sheet are used to establish the capability of the board to resist pressure waves. The principal advantage of this structure is that it permits the gas or steam released under pressure from a ruptured pipe or pressure vessel to escape from the containment without destroying the latter. With proper filtering materials in the diffusion board all dangerous particulate and gases are retained safely within the containment.

In utilizing the diffusion board it is apparent that the complete structure of the building can be made of this material thus decreasing structural costs and eliminating the need for heavy pressure vessel containments. The amount of surface area then available for filtration and absorption is rather large because it represents the walls of the reactor building. Further, if desired the diffusion board can be used as a portion of a reactor building, as for example, a sheet metal building with sections removed to be replaced with diffusion board to allow for the release of filtered air or steam free from contaminants.

It is thus a first object of this invention to provide a structural material having the ability to filter out certain undesirable materials.

It is another object of this invention to provide a filter construction material capable of removing radioactive materials and of sufficient strength to absorb shock waves.

It is still another object of this invention to provide a filter for separating out particulate and certain radioactive gases from a gaseous material at high temperatures and pressures.

Another object is provision of a board capable of withstanding high temperatures and pressures which is porous to permit the escape of radioactive gases while retaining particulates.

Other objects and advantages of this invention will hereinafter become more evident from the following description of a preferred embodiment of this invention as illustrated in the accompanying figure of an exploded portion of a diffusion board.

Referring to the accompanying drawing there is shown an exploded section of a diffusion board 10 in accordance with a preferred embodiment of this invention consisting of outer flat sheets 12 and 14 which would be constructed from fine glass web or equivalent material capable of trapping particulate. Sandwiched between sheets 12 and 14 are a pair of sheets 16 and 18 consisting of flat expanded metal which provide some of the structural rigidity required for use of board 10 as a structural material. In the center enclosed by expanded metal sheets 16 and 18 is a honeycomb 22 which would be filled with a material capable of adsorbing the undesirable gaseous product. Honeycomb 22 would be made out of a suitable non-combustible material such as aluminum, stainless steel, or reinforced fiber glass. A satisfactory adsorbent for a particular application would be activated charcoal which has a known efficiency in performance exceeding 99% for removing halogens and certain other gases. Other suitable adsorbents would be a silver plated silica-gel or copper turnings as described in my U.S. Patent No. 2,994,577 depending on the type of gases which are to be removed.

The portions or sections or elements making up the diffusion board 10 are shown expanded in the accompanying figure to illustrate the inside construction of the board. However, when assembled together it forms a relatively thin, flat, compact, rigid sheet which can be used as a structural material incorporating filtration and gas adsorption components which serve as a filtration enclosure preventing any sudden or delayed release of radioactive contamination from a reactor fuel rupture or similar accident.

In the use of the diffusion board described above, it will be seen that the board is a cell-like structure which has the capability of resisting pressures encountered in postulated reactor accidents or releases. As the worst reactor accident postulated for a water reactor and some gas cooled reactors is the loss of coolant, the structure must resist inherent steam pressure developed by a sudden release and any shock wave that may be created. Under this concept the diffusion board described above is made strong enough to resist both forces and it will also act as an air cleaner and yet is not as expensive as the present unfired pressure vessels made of steel plate. Hence, the diffusion board is able to function for both water and gas cooled reactors and handle many types of releases including the most severe accident possible.

It will also be noted that the diffusion board described above is not combustible and is not subject to deterioration and corrosion at normal atmospheric conditions while at the same time it can mechanically resist steam pressures as high as 100 p.s.i. and temperatures up to 250° F. Calculations and tests also indicate that the diffusion board will resist shock waves with other pressures not exceeding 3 inches of mercury prolonged for several hours and gamma radiation. By the use of carbon the diffusion board can be made to remove radioactive halogen gases with 99.9% efficiency, and at the same time be completely permeable to water vapor. The resistance characteristics of the diffusion board are such that diffusion velocities can readily take place at resistances below 6 inches of water.

The diffusion board furthermore is inexpensive enough to show substantial reduction in cost over the materials now used for reactor housings or for off-gas cleaning units. The honeycomb 22 as mentioned can be metals such as aluminum or stainless steel, or any one of a number of plastic materials. In addition, the honeycomb walls can be silverplated surfaces depending on the type of reactor and the types of accidents which it might be caused to face. The outer face sheets 12 and 14 may be corrugated to obtain additional strength if desired and have glass fiber media attached to the inside surface.

It will thus be seen that there has been provided a unique apparatus for increasing the safety characteristics of a nuclear power plant and yet reducing the cost of same. With the use of an effective material of this type to contain a reactor vessel, substantial savings in metal or unfired pressure vessel costs may be obtained thereby making significant cost reductions of a nuclear power plant. In addition it is possible to provide relatively inexpensively an outer containment or building structure which will reduce significantly the hazards to the surrounding population and also reduce and in some situations eliminate the need for expensive standby equipment to be used only in the case of a severe nuclear accident.

While, of course, only a preferred embodiment of this invention has been described it is understood that many variations thereof may be made without departing from the principles of this invention.

I claim:
1. A thin multi-layer diffusion board capable of withstanding shock waves up to at least 100 p.s.i. with other pressures not exceeding 3 inches of mercury prolonged for at least one hour and adsorbing undesirable gases and solid particulate in high pressure gases comprising a means for trapping particulate consisting of two thin layers of fine fibrous glass web, means interposed between said thin layers for imparting structural rigidity consisting of a pair of flat metal sheets which have been expanded to provide a multiplicity of passages therethrough, and means interposed between said metal sheets consisting of a honeycomb structure having its passages in a normal relationship to the surface of the sheets and containing an adsorbent material capable of removing undesirable gaseous products.

2. The diffusion board of claim 1 in which said adsorbent material is selected from the group consisting of activated charcoal, silver-plated silica-gel, and silver-plated copper turnings.

3. The diffusion board of claim 1 in which said honeycomb structure is made of non-combustible material selected from the class consisting of aluminum, stainless steel, and reinforced fiber glass.

References Cited by the Examiner
UNITED STATES PATENTS

| | | | |
|---|---|---|---|
| 1,521,575 | 12/1924 | Wittemeier | 55—483 X |
| 2,167,236 | 7/1939 | Gieseler | 55—304 |
| 2,395,842 | 3/1946 | Borgstrom | 55—387 X |
| 2,614,650 | 10/1952 | Chandler et al. | 55—387 X |
| 2,764,251 | 9/1956 | Jessop | 55—475 X |
| 2,774,443 | 12/1956 | Slayter | 55—341 X |
| 2,994,577 | 8/1961 | Silverman | 252—439 |
| 3,063,218 | 11/1962 | Pernert et al. | 55—71 |

FOREIGN PATENTS

| | | |
|---|---|---|
| 733,905 | 7/1932 | France. |
| 1,118,760 | 12/1961 | Germany. |

REUBEN FRIEDMAN, *Primary Examiner.*